United States Patent
Barley et al.

(10) Patent No.: US 8,421,861 B2
(45) Date of Patent: Apr. 16, 2013

(54) WILDLIFE SURVEILLANCE CAMERA

(75) Inventors: Christopher B. Barley, Grand Prairie, TX (US); James Brandon Roach, Grand Prairie, TX (US); Geoffrey A. Mantooth, Fort Worth, TX (US)

(73) Assignee: WGI Innovations, Ltd., Grand Prairie, TX (US)

( * ) Notice: Subject to any disclaimer, the term of this patent is extended or adjusted under 35 U.S.C. 154(b) by 415 days.

(21) Appl. No.: 12/752,608

(22) Filed: Apr. 1, 2010

(65) Prior Publication Data

US 2011/0242315 A1    Oct. 6, 2011

(51) Int. Cl.
*H04N 7/18*     (2006.01)
*H04N 5/22*     (2006.01)

(52) U.S. Cl.
USPC .......................................... 348/143; 348/208

(58) Field of Classification Search .................. 348/143, 348/373, 155
See application file for complete search history.

(56) References Cited

U.S. PATENT DOCUMENTS

| | | | |
|---|---|---|---|
| 5,819,124 A | 10/1998 | Somner et al. | |
| 5,878,283 A | 3/1999 | House et al. | |
| 6,449,431 B1 * | 9/2002 | Cuddeback et al. | ............ 396/27 |
| 6,735,387 B1 | 5/2004 | Schnell | |
| 6,768,868 B1 | 7/2004 | Schnell | |
| 6,834,162 B1 | 12/2004 | Schnell | |
| 7,149,422 B2 | 12/2006 | Schnell | |
| 7,308,196 B2 | 12/2007 | Schnell | |
| 7,471,334 B1 * | 12/2008 | Stenger | ........................ 348/373 |
| 7,593,632 B2 | 9/2009 | Schnell | |
| 7,710,457 B2 * | 5/2010 | Schnell | .................... 348/208.14 |
| 2002/0054212 A1 | 5/2002 | Fukuoka | |
| 2005/0151851 A1 | 7/2005 | Schnell | |

* cited by examiner

*Primary Examiner* — David Czekaj
*Assistant Examiner* — Tsion B Owens
(74) *Attorney, Agent, or Firm* — Geoffrey A. Mantooth

(57) ABSTRACT

A wildlife surveillance camera has a housing and first and second battery compartments located in the housing, which battery compartments are sized to receive at least two batteries in end-to-end fashion. The battery compartments are separated from each other by a gap which contains the electronics for the camera. The camera unit has an inner door that closes the access openings into the battery compartments. An outer door is provided to provide access to the inner door. The camera image sensor, the triggering device and the display are all mounted to the rear portion of the housing.

14 Claims, 8 Drawing Sheets

WILDLIFE SURVEILLANCE CAMERA

FIELD OF THE INVENTION

The present invention relates to cameras that are used to scout wildlife.

BACKGROUND OF THE INVENTION

Cameras are used to scout or survey wildlife. For example, a camera is set up near a game trail, feeder, watering hole or other area where wildlife pass or gather on a frequent basis. The camera is mounted to a tree, post, etc. It has a sensor to detect the presence of wildlife. Thus, the camera automatically takes pictures when wildlife are detected. The automatic operation of the camera is useful because a human operator need not monitor the camera for long periods of time in order to operate it. Also, there is no human operator present which might repel wildlife.

These cameras are known as game scouting cameras or trail cameras. The cameras can be film or digital and can take still pictures or movies (video). The cameras can also be equipped with a flash. The flash can be of white light, infrared light or a camera may have both types of flashes.

The earliest cameras used to scout wildlife were believed to be conventional cameras mounted in housings to protect the camera from the weather. As scouting cameras have evolved, the cameras are specifically designed units for the particular task. The evolution of scouting cameras continues.

SUMMARY OF THE INVENTION

A wildlife surveillance camera comprises a housing, first and second battery compartments and camera electronics. The first and second battery compartments are located in the housing with each of the first and second battery compartments sized to receive at least two batteries in an end-to-end orientation. Each of the first and second battery compartments has an opening adjacent to and end of the respective battery compartment so as to allow for the insertion and removal of batteries into the respective compartment. The first and second battery compartments are separated from each other by a gap. The camera electronics are located in the housing and comprise a processor and externally facing components. The externally facing components comprise an image sensor, a display and a triggering sensor. The externally facing components are located in the gap between the first and second battery compartments.

In accordance with one aspect of the present invention, each of the first and second battery compartments comprise a channel formed in the housing and a cover over the channel, with the cover being coupled to the housing.

In accordance with another aspect, the camera further comprises an inner door and an outer door. The inner door is movable between open and closed positions. When the inner door is in the closed position, the openings to the first and second battery compartments are closed and when the inner door is in the open position, the openings to the first and second battery compartments are open. The outer door is movable between open and closed positions. When the outer door is in the closed position, the inner door is inside of the housing and when the outer door is in the open position, the inner door is exposed to the exterior of the housing.

In accordance with another aspect, the housing has a top end and a bottom end. The inner and outer doors are located at one of the ends.

In accordance with still another aspect, when the outer door is in the open position, a user input device is exposed to the exterior.

In accordance with still another aspect, when the outer door is in the open position, a data output port and a receptacle for external memory is exposed to the exterior.

In accordance with still another aspect, the camera further comprises inner and outer doors. The inner door is movable between open and closed positions, wherein when the inner door is in the closed position, the openings to the first and second battery compartments are closed and when the inner door is in the open position, the openings to the first and second battery compartments are open. The outer door is movable between open and closed positions, wherein when the outer door is in the closed position, the inner door is inside of the housing and when the outer door is in the open position, the inner door is exposed to the exterior of the housing. Each of the first and second battery compartments comprise a channel formed in the housing and a cover over the channel. The cover is coupled to the housing. The housing has a top end and a bottom end, with the inner and outer doors being located at one of the ends. When the outer door is in the open position, a user input device is exposed to the exterior. When the outer door is in the open position, a data output port and a receptacle for external memory is exposed to the exterior.

In accordance with still another aspect, the externally facing components are arranged in a column on a front of the housing.

A wildlife surveillance camera comprises a housing, an image sensor, a triggering sensor, a display, a processor, a user input device and at least one battery compartment. The housing has a front, a rear, and sides, as well as ends. The processor is for processing images from the image sensor when the triggering sensor is activated and for providing information to the display. The user input device is connected to the processor. The image sensor, the triggering sensor and the display face the exterior of the front of the housing. The user input device and the battery compartments are accessible by a door on one of the ends of the housing. The image sensor, the triggering sensor and the display are unblanketed by the door.

In accordance with another aspect, a power on switch is located on the front of the unit, which switch turns on the display on when activated. The power on switch is exposed to the exterior of the housing.

In accordance with another aspect, a data port and an external memory receptacle are accessible by the door.

A wildlife surveillance camera comprises a housing and camera electronics. The housing has front and rear portions which couple together to form an interior cavity. The housing front portion has an opening. The camera electronics comprises an image sensor, a triggering device, a display and a processor. The processor is connected to the image sensor, the triggering device and the display. The camera electronics are located in the interior cavity. The display is mounted to the housing rear portion such that the display is adjacent to the opening and such that when the housing front portion is removed from the housing rear portion, the display remains with the housing rear portion.

In accordance with one aspect, a transparent pane is across the opening. The display is separated from the pane by a gap.

In accordance with still another aspect, the image sensor and the triggering device are aligned with the respective openings in the housing front portion. The image sensor and the triggering device are mounted to the housing rear portion.

In accordance with still another aspect, a camera lens is adjacent to the image sensor. The lens has a focal axis. The display is angled below the focal axis.

DESCRIPTION OF THE PREFERRED EMBODIMENT

Figure 1:
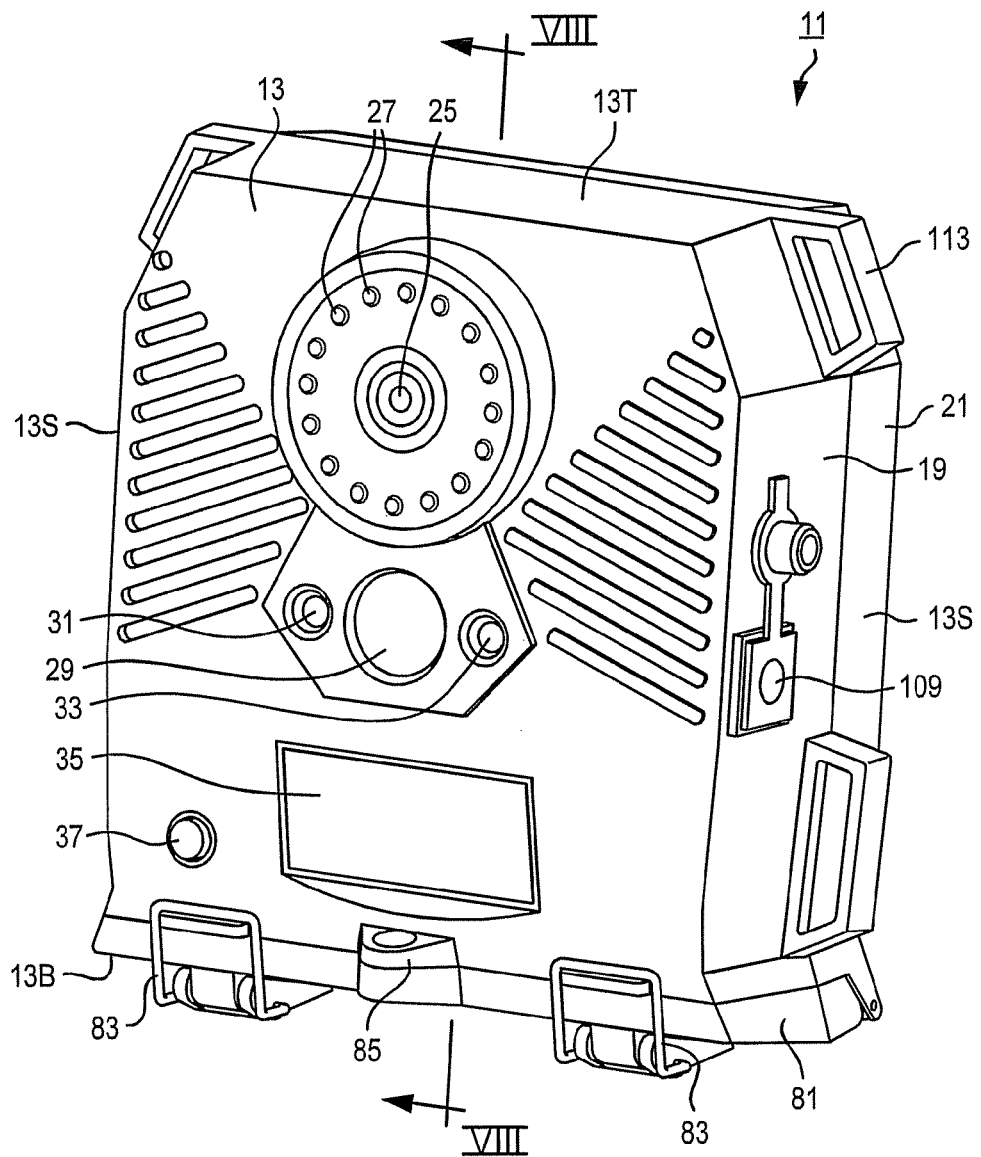
FIG. 1 is a perspective view of the front of the camera unit, in accordance with a preferred embodiment.
Figure 4:
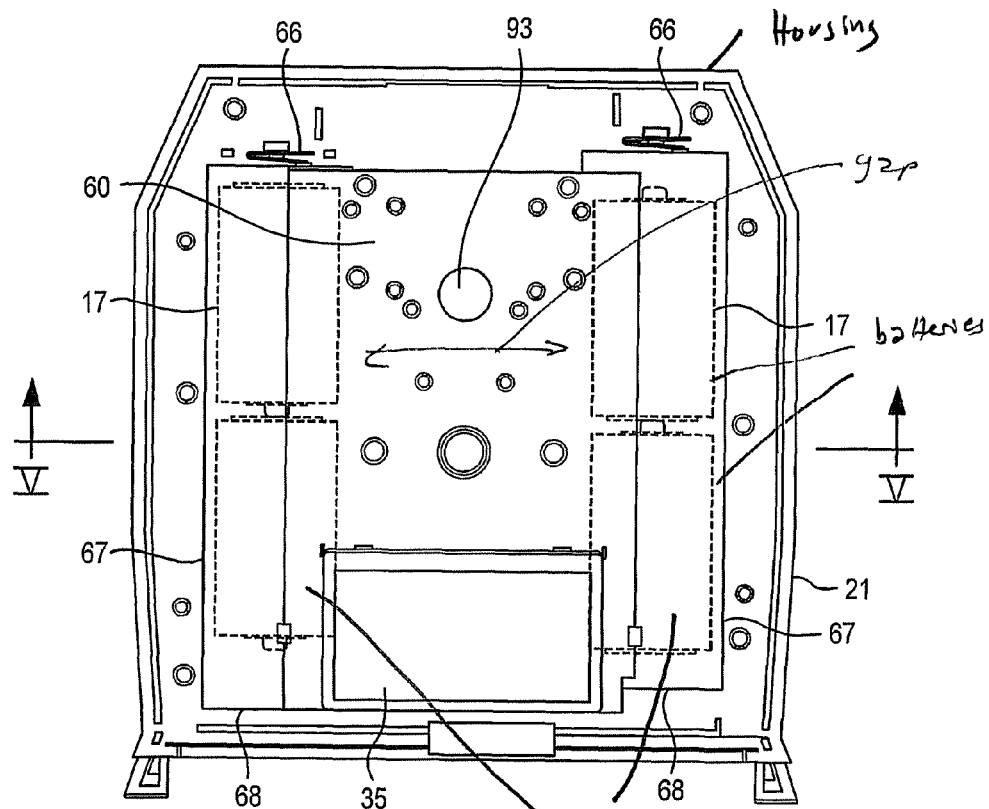
FIG. 4 is a front plan view of the interior of the rear portion of the camera housing.

In FIG. 1, there is shown a view of a camera unit 11. The camera operates automatically and can be used to photograph wildlife. When an animal moves in front of the camera, the animal is sensed and the camera takes a picture. The camera unit 11 has a housing 13, camera electronics 15 (see FIG. 2) and batteries 17 (see FIGS. 2 and 4).

The housing 13 has front and rear portions 19, 21. The front and rear portions 19, 21, when coupled together, have an interior cavity 23 (see FIG. 3) for the camera electronics and the batteries. As shown in FIG. 1, which shows the front of the camera unit, there is a camera lens 25, a flash assembly 27, a triggering sensor 29, a status light 31, a light sensor 33, a display 35 and a power on button 37 for the display 35.

Figure 2:
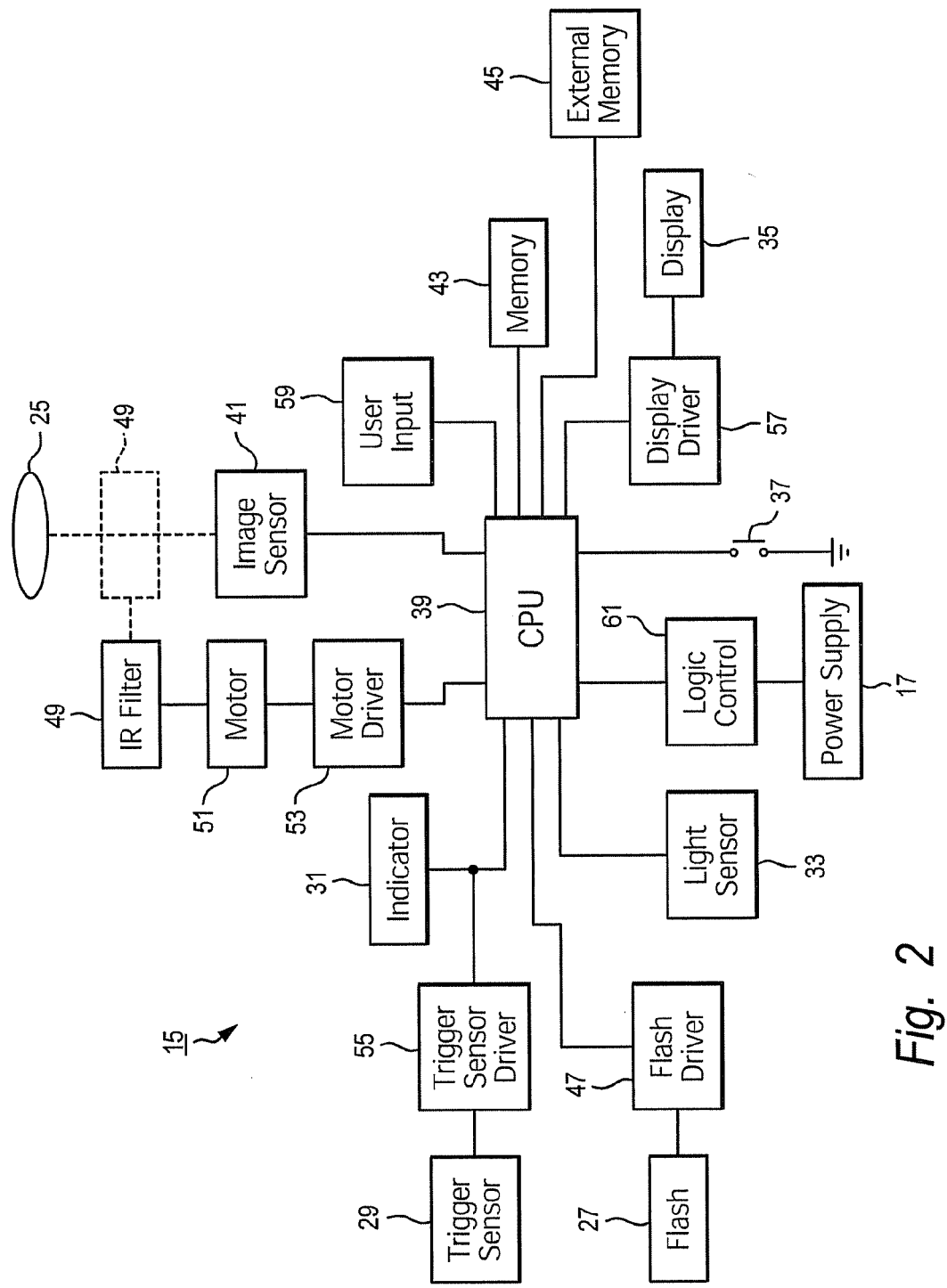
FIG. 2 is a block diagram of the electrical components of the camera unit.

Referring to FIG. 2, a block diagram of the electronics 15 is shown. A central processing unit (CPU) 39 is provided. In the preferred embodiment, the CPU incorporates features of a video processor. An image sensor 41 provides inputs to the CPU. The image sensor 41 can be a CCD or a CMOS type sensor. The image sensor is located behind the lens 25. Memory 43 is connected to the CPU 39. The memory 43 can be NAND flash memory, STRAM memory or a combination thereof, or some other type of memory. In addition, removable memory devices 45 such as memory cards, can be used. Memory cards are referred to as external memory. The memory card 45 is inserted into a slot 77 in the bottom of the camera (see FIG. 7). The lens 25, image sensor 41, CPU 39 and memory 43 make up the major components of the camera. The camera described herein is a digital camera. In the preferred embodiment, the camera takes still photographs. However, the camera can be configured to make video images.

The camera can take pictures in daylight and also in low-light conditions, such as night, using a flash 27. In the preferred embodiment, the flash is an infrared flash. The infrared flash 27 is provided by a series of infrared LED's, which are powered by a flash driver 47. The flash driver is connected to the CPU 39.

An infrared filter 49 is removably provided between the lens 25 and the image sensor 41. In daylight conditions, the infrared filter 49 is located in front of the image sensor 41. Thus, light passes through the infrared filter to reach the image sensor. In low light conditions, the infrared filter 49 is moved out of the light path of the image sensor so as to be out of the way. (In FIG. 2, the IR filter 49 is shown in solid lines out of the light path between the lens 25 and image sensor 41 and shown in dashed lines in the light path.) A motor 51 and a motor driver 53 move the infrared filter 49 in front of and out of the way of the image sensor. The motor driver 53 is connected to the CPU 39. The motor 51 has a speed reducer 91 in the form of gearing that moves the IR2 filter 49 (see FIG. 8).

The camera could be equipped with a white light flash for night and low light photography using visible light. The camera can be equipped with one or both types of flashes.

The camera, and if needed the flash, is triggered by the triggering, or trigger, sensor 29. In the preferred embodiment, the triggering sensor is a passive infrared (PIR) sensor, or a motion sensor. The PIR sensor is located behind a cover that is transparent to infrared. The PIR sensor 29 is connected to the CPU 39 by way of a driver 55. An indicator light 31 is provided on the front of the unit to illuminate when the PIR sensor 29 is affected by motion. This allows the PIR sensor operation to be tested and verified.

The camera unit 11 has a display 35 for providing information. In the preferred embodiment, the display is a liquid crystal display (LCD). The LCD 35 is connected to the CPU 39 by way of an LCD driver 57. In the preferred embodiment, the display shows the strength of the battery charge, the date and time, the number of pictures taken and the number of pictures remaining that can be stored with the available memory 43, 45.

The power on button 37, located on the front of and exterior of the unit, turns the display 35 on.

The camera unit 11 has a user input 59 in the form of several buttons for an operator to program the camera. The user input will be discussed in more detail below with reference to FIGS. 6 and 7.

Figure 3:
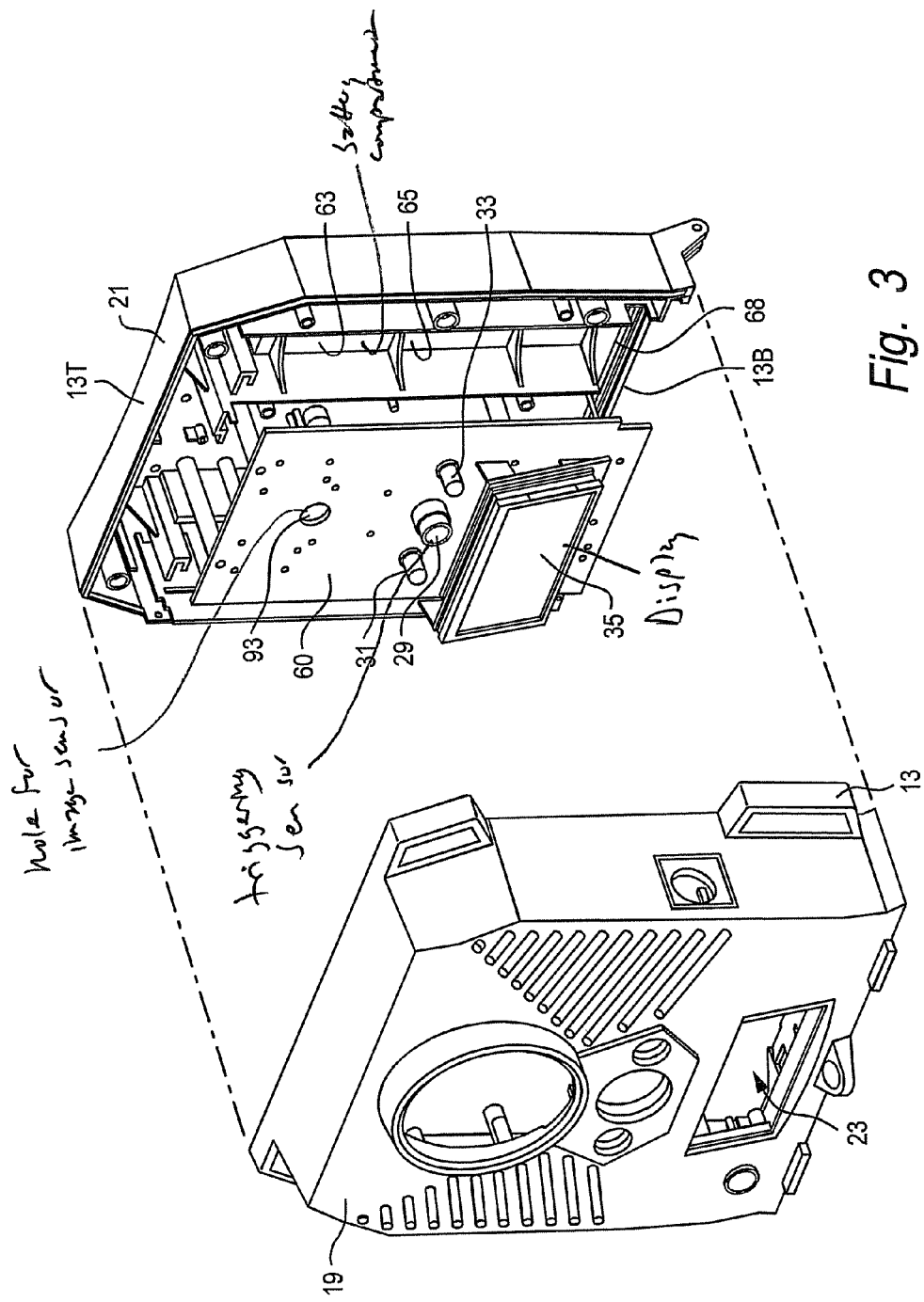
FIG. 3 is an exploded perspective view of the front and rear portions of the camera housing.

Referring to the orientation of FIG. 1, the housing 13 has a top end 13T, a bottom end 13B and sides 13S, as well as a front side and a rear side (on the respective front and rear portions 19, 21). The front portion 19 has openings, which openings provide access for the camera lens 25 and flash 27, as well as the PIR sensor 29 and the display 35. These openings are shown in FIG. 3, where the front portion 19 is shown without any covers or panes over the openings. FIG. 3 also shows the interior cavity formed by the front and rear portions 19, 21, as well as a circuit board 60 with some (but not all) of the electronic components.

The batteries 17 provide an onboard power supply. The batteries are connected to a control circuit 61 (see FIG. 2) that regulates the electrical power provided to the CPU 39 and various other components. The batteries 17 are located in two battery compartments 63 (see FIGS. 3-5), which battery compartments are separated from each other by a gap or a space. Occupying the space between the battery compartments 63 are the remaining electronics and corresponding support structure. Each battery compartment 63 is made of a channel 65 located in the rear housing portion 21. Referring to the orientation shown in FIG. 3, the channel extends from the bottom end 13B of the housing portion up towards the top end 13T; where the channel ends at a stop. A battery terminal 66 is coupled to the stop (see FIGS. 4 and 5). Each battery compartment 63 has a cover 67. The channel 65 and the cover 67 form a battery compartment 63 cavity for receiving batteries. In the preferred embodiment, the batteries are cylindrical in shape. The bottom end of each battery compartment 63 has an opening 68. The batteries are loaded shotgun style, or in end-to-end fashion in the battery compartments through the opening. The batteries 17 are shown in dashed lines in the drawings. Each battery compartment 63 receives two batteries 17.

Figure 6:
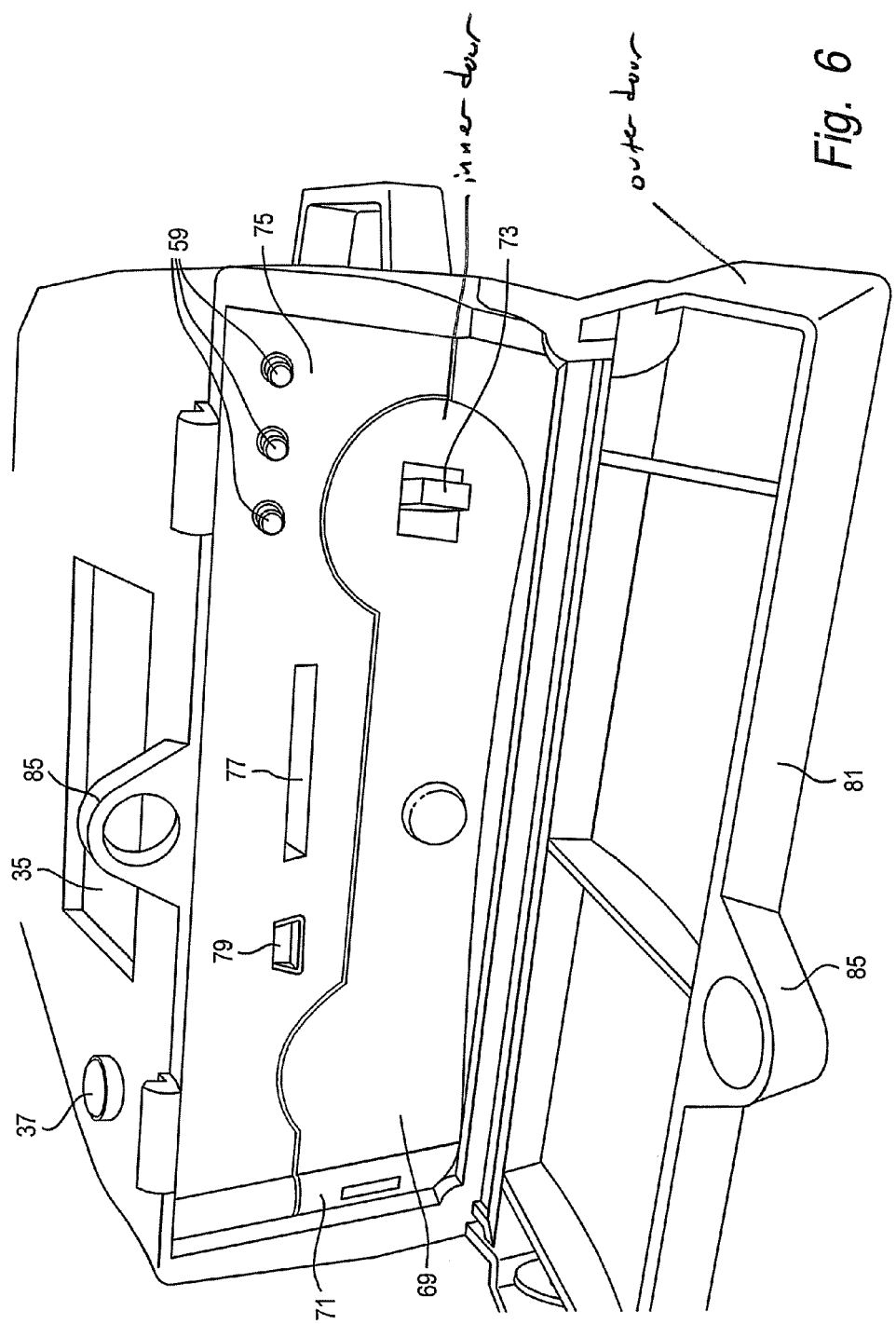
FIG. 6 is a perspective view of the bottom of the camera unit showing the external door open and the interior battery compartment door in the closed position.
Figure 7:
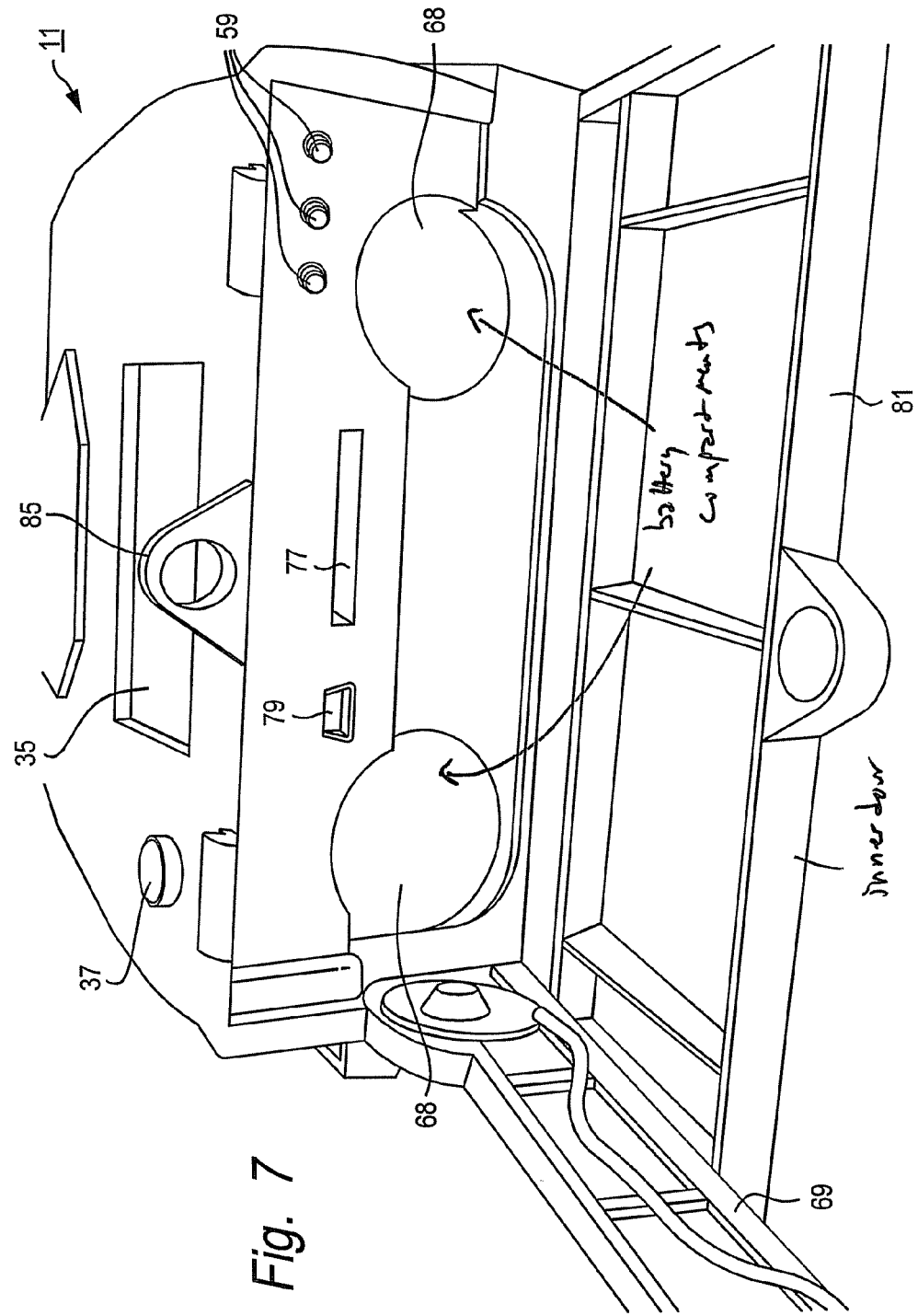
FIG. 7 is a perspective view of the bottom of the camera unit showing the external door open and the interior battery compartment door in the open position.

Referring to FIGS. 6 and 7, the bottom ends of the battery compartment 63 are closed by an internal door 69. The internal door has a hinge 71 on one end for swinging the door 69 open to provide access to the openings 68 for the battery compartments 63. The other end of the door has a releasable latch 73 for securing the door in the closed position, wherein the battery compartments are closed. The internal door 69 and latch 73 are strong enough to support the weight of the batteries when the unit is mounted and installed. When closed, the internal door 69 is flush with a bottom wall 75, which bottom wall has the user input 59, a slot 77 for receiving the external memory card and a data port 79. The unit has an external door 81 that is hinged on the back side and can swing down to open and expose the internal door 69 and bottom wall 75. The external door has releasable wire latches 83 (see FIG. 1) to close the internal door (the latches 83 are not shown in FIGS. 6 and 7, also, due to the oblique angle, the lens and flash are not shown in FIGS. 6 and 7).

The external door 81 and the housing front portion 19 has aligned loops 85 for receiving a lock or other security device.

A gasket (not shown) is provided in the external door, which provides a barrier to moisture. When the external door 81 is closed, the batteries, user input 59, external memory and data port cannot be accessed.

As shown in FIGS. 6 and 7, in the preferred embodiment, the user input 59 comprises buttons, namely "mode", "+", "–". The user programs the camera by pressing the power on button 37 on the camera front to turn on the display 35 and then pressing the mode button to select which data is to be programmed. For example, one mode could be to program date (month-day-year), while another mode could program time (hours-minutes-am/pm). The user uses the "+" and "–" buttons, to input the proper date.

Figure 8:
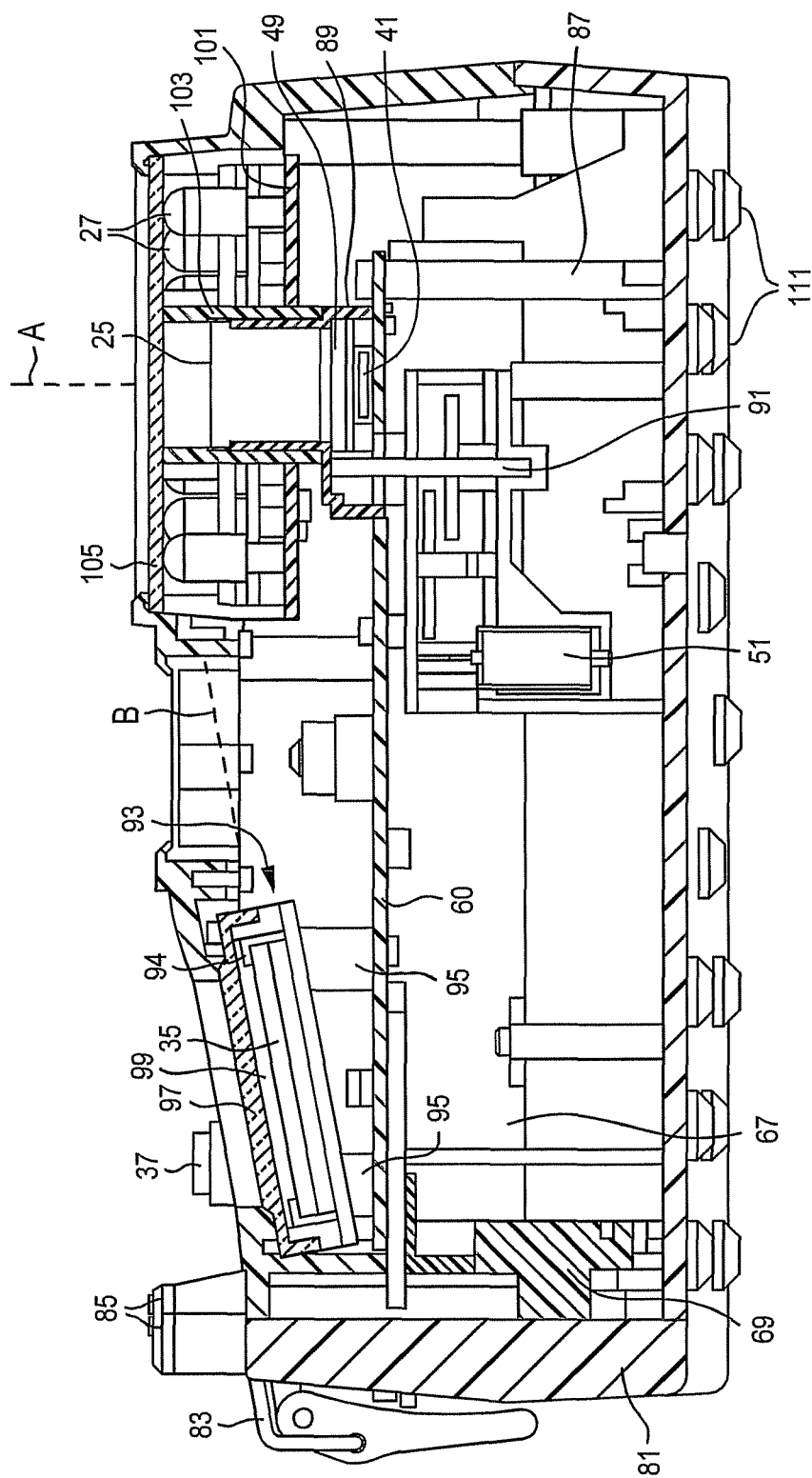
FIG. 8 is a cross-sectional view, taken through lines VIII-VIII of FIG. 1.

Most of the electronics are mounted to the rear portion 21 of the housing. As shown in FIG. 8, most of the electronics are mounted to the circuit board 60 that is in turn mounted to the rear portion 21 of the housing by way of supports 87. The image sensor 41, lens 25 and IR filter 49 are in an image sensor housing 89, shown in FIGS. 5 and 8, which housing is mounted to the board 60. The motor 51 for moving the IR filter 49 is located below the board 51. A drive mechanism 91, comprising gearing and shafts, couples the motor to the IR filter. A hole 93 is provided in the board 60 to allow a portion of the drive mechanism to pass therethrough and into the image sensor housing 89.

The LCD 35 is mounted in an assembly 93, which assembly is in turn mounted to the board 60. A bracket 94 is around the edges of the LCD and secures the LCD and some other components to the assembly 93. The LCD 35 is tilted or angled relative to the board. This tilt has the effect of angling the LCD when viewed from the exterior of the housing. The LCD assembly 93 has supports 95 that space the LCD from the board 60 and that provide the angle. In the preferred embodiment, the plane B of the LCD (shown in dashed lines in FIG. 8) is tilted relative to the focal axis A (shown in dashed lines in FIG. 8) the camera and is not perpendicular thereto. With the camera oriented in a typical manner, wherein the exterior door 81 is at the bottom of the unit, the LCD is tilted downwardly relative to the focal axis A. When the camera unit is disassembled, the LCD 35 and the LCD assembly 93 are coupled to the housing rear portion 21; the housing front portion 19 can be removed therefrom. The housing front portion 19 has a transparent cover 97 or window, which cover is mounted to the housing front portion 21. The LCD assembly 93 is located relative to the transparent cover 97 so that the LCD can be seen from the exterior of the camera unit. There is a gap or space 99 between the LCD 35 and the transparent cover 97.

The trigger sensor 29, the status light 31 and the light sensor 33 are mounted to the board 60 (see FIG. 3). When the housing front and rear portions 19, 21 are assembled, these components align with their respective openings, which openings are provided with transparent covers. The cover for the trigger sensor 29 need not be transparent to visible light, but is transparent to infrared light. In the preferred embodiment, the cover for the triggering sensor 29 has a Fresnel lens (not shown in FIG. 8).

Figure 9:
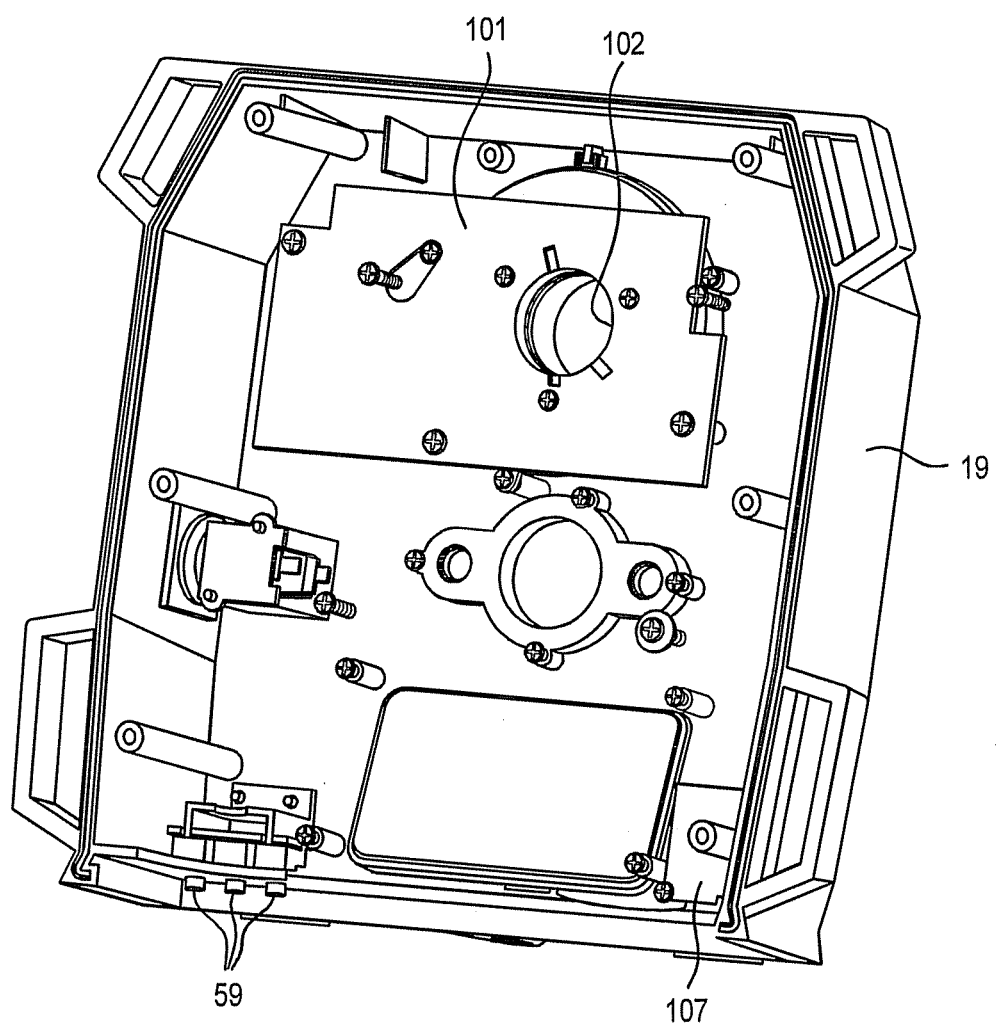
FIG. 9 is a perspective view of the interior of the front portion of the camera housing.

The flash 27 is mounted to a board 101, that is in turn mounted to the housing front portion 19 (see FIG. 9). The board 101 has an opening 102 for receiving a cylindrical portion 103 of the image sensor housing 89. The opening on the housing front portion 19 for the flash and camera has a transparent cover 105. Thus, the LCD 35, the lens 25, the flash 27, the trigger sensor 29, the status light 31 and the light sensor 33 are externally facing and visible, either with visible light or infrared light, from the exterior of the camera unit. The exterior door 81 does not cover or blanket these components, as the exterior door is located on a different part of the camera unit. Furthermore, the externally facing components 35, 25, 27, 29, 31, 33 are arranged in a column on a front of the housing. That is to say that the lens 25 and flash 27, which are nested together in the preferred embodiment, are in one location along the column, with the trigger sensor 29, status light 31 and light sensor 33 are at another location along the column, and the LCD 35 at a third location along the column.

The power on switch 37 is exposed on the exterior of the housing and is not covered or blanketed by the exterior door 81. The power on button 37 is mounted to the housing front portion 19 (see FIG. 9). A circuit board 107 is mounted to the housing front portion 19. The board 107 interacts with the power on button 37.

The housing has an external power port 109 on one of the sides. The power port allows the use of an external power supply. When the port is not in use, it is covered by an elastomeric plug.

Figure 5:
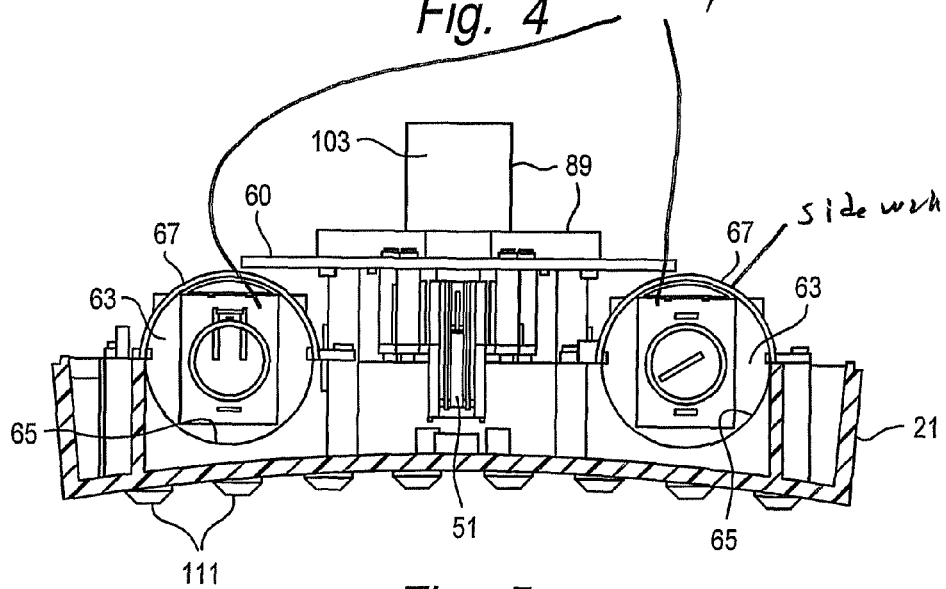
FIG. 5 is a cross-sectional view taken through lines V-V of FIG. 4.

The rear of the housing is curved as shown by FIG. 5 and is provided with projections or bosses 111. The projections 111 serve to prevent the unit from sliding down a pole or tree. Loops 113 (see FIGS. 1 and 3) are provided on the unit sides, which loops are used to secure the unit to a mounting structure, such as a tree or post.

The unit is easily made operational and installed. The battery compartments 63 are accessed by opening the external door 81 and the internal door 69. The batteries are loaded into the battery compartments. The shotgun style loading simplifies installing batteries in the respective compartments. The internal door 69 is closed and latched. The operator uses the user input buttons 59 to set the date and time. A memory card 45 may be inserted into the unit by the slot 77. The external door is then closed and latched.

The camera unit 11 is mounted by hooking straps or bungee cords into the side loops 113 and around a tree or post. The camera unit can be mounted to the mounting structure by other mounting arrangements as well. The camera is pointed in the desired direction. The operator can wave a hand or walk in front of the unit to activate the trigger or motion sensor 29. The light 31 on the front of the unit will illuminate when the motion sensor is activated.

Once the camera is set up, the operator can leave. The camera operates automatically. When the motion sensor 29 detects motion, a signal is provided to the CPU 39. The CPU reads the input from the light sensor 33 and determines if the flash 27 is needed for the level of light. If no flash is needed, then the image sensor 41 captures an image. The CPU 39 processes the image data from the image sensor and stores it in memory. If a flash is needed, the CPU operates the motor driver which causes the motor 51 to move the infrared filter 49 out of the light path to the image sensor. The CPU then causes the flash driver to operate the flash. While the flash provides illumination, the image sensor captures an image, which is then processed by the CPU and stored memory. The camera is then ready to take another picture if the motion sensor is triggered again. The camera can have a minimum time delay between pictures.

The operator can easily check the camera from time to time. The power on button 37 is pushed to turn on the display 35. The operator need not open the exterior door 81 or any cover to turn on and read the display 35. The display stays on for a predetermined period of time before being turned off to preserve battery power. The operator reads the display to see how many pictures have been taken and how many can be taken with the available memory. The operator can open the exterior door 81 and remove the memory card from the camera. The operator can also plug a cable into the data port 79 to access the internal memory and access any pictures stored in the internal memory. Once the pictures have been offloaded or downloaded from the camera, the pictures can be viewed on a computer.

Note that although the preferred embodiment has been described as having the openings to the battery compartments on one end of the housing, namely the bottom, the openings could be on the front, rear or sides. The openings would be slots or elongated to allow the batteries to be inserted and removed from the battery compartments.

The foregoing disclosure and showings made in the drawings are merely illustrative of the principles of this invention and are not to be interpreted in a limiting sense.

The invention claimed is:

1. A wildlife surveillance camera, comprising:
   a) a housing;
   b) first and second battery compartments located in the housing with each of the first and second battery compartments comprising a side wall that forms an elongated interior cavity that extends between two ends, with each of the cavities sized to receive at least two batteries in an end-to-end orientation, with one of the cavity ends of each of the first and second battery compartments being open so as to allow for the insertion and removal of batteries into the respective compartment with the respective side wall blocking insertion and removal of batteries into the respective compartment;
   c) the first and second battery compartments being separated from each other by a gap;
   d) camera electronics located in the housing and comprising a processor and externally facing components, the externally facing components comprising an image sensor, a display and a triggering sensor;
   e) the externally facing components being located in the gap between the first and second battery compartments
   f) an inner door movable between open and closed positions, wherein when the inner door is in the closed position, the openings to the first and second battery compartments are closed and when the inner door is in the open position, the openings to the first and second battery compartments are open;
   g) an outer door movable between open and closed positions, wherein when the outer door is in the closed position, the inner door is inside of the housing and when the outer door is in the open position, the inner door is exposed to the exterior of the housing.

2. The wildlife surveillance camera of claim 1, wherein the side wall of each of the first and second battery compartments comprise a cover over a channel formed in the housing, the cover coupled to the housing.

3. The wildlife surveillance camera of claim 1, wherein the housing has a top end and a bottom end, the inner and outer doors being located at one of the ends.

4. The wildlife surveillance camera of claim 1, wherein when the outer door is in the open position, a user input device is exposed to the exterior.

5. The wildlife surveillance camera of claim 1, wherein when the outer door is in the open position, a data output port and a receptacle for external memory is exposed to the exterior.

6. The wildlife surveillance camera of claim 1, further comprising: a) the side wall of each of the first and second battery compartments comprise a channel formed in the housing and a cover over the channel, the cover coupled to the housing; b) the housing has a top end and a bottom end, the inner and outer doors being located at one of the ends; c) when the outer door is in the open position, a user input device is exposed to the exterior; d) when the outer door is in the open position, a data output port and a receptacle for external memory is exposed to the exterior.

7. The wildlife surveillance camera of claim 1, wherein the externally facing components are arranged in a column on a front of the housing.

8. A wildlife surveillance camera, comprising: a) a housing having a front, a rear and sides, as well as ends; b) an image sensor; c) a triggering sensor; d) a display; e) a processor for processing images from the image sensor when the triggering sensor is activated, and for providing information to the display; f) a user input device connected to the processor; g) at least one battery compartment accessible by an opening; h) the image sensor, the triggering sensor and the display facing the exterior of the front of the housing; i) the user input device and the battery compartment being accessible by an outer door on one of the ends of the housing, the image sensor, the triggering sensor and the display being unblanketed by the outer door; j) an inner door movable between open and closed positions, wherein when the inner door is in the closed position, the openings to the first and second battery compartments are closed and when the inner door is in the open position, the openings to the first and second battery compartments are open; k) the outer door movable between open and closed positions, wherein when the outer door is in the closed position, the inner door is inside of the housing and when the outer door is in the open position, the inner door is exposed to the exterior of the housing.

9. The wildlife surveillance camera of claim 8, further comprising a power on switch located on the front of the unit, the power on switch turning the display on when activated, the power on switch being exposed to the exterior of the housing.

10. The wildlife surveillance camera of claim 8, further comprising a data port and an external memory receptacle accessible by the door.

11. A wildlife surveillance camera, comprising:
   a) a housing having front and rear portions which couple together to form an interior cavity, the housing front portion having an opening;
   b) camera electronics comprising an image sensor, a triggering device, a display and a processor, the processor connected to the image sensor, the triggering device and the display, the camera electronics located in the interior cavity;

c) the display being mounted to the housing rear portion such that the display is adjacent to the opening and such that when the housing front portion is removed from the housing rear portion, the display remains with the housing rear portion d) a battery compartment accessible by an opening;

e) an inner door movable between open and closed positions, wherein when the inner door is in the closed position, the openings to the first and second battery compartments are closed and when the inner door is in the open position, the openings to the first and second battery compartments are open;

f) an outer door movable between open and closed positions, wherein when the outer door is in the closed position, the inner door is inside of the housing and when the outer door is in the open position, the inner door is exposed to the exterior of the housing.

12. The wildlife surveillance camera of claim 11, further comprising a transparent pane across the opening, the display separated from the pane by a gap.

13. The wildlife surveillance camera of claim 1, wherein the image sensor and the triggering device are aligned with the respective openings in the housing front portion, the image sensor and the triggering device being mounted to the housing rear portion.

14. The wildlife surveillance camera of claim 11, further comprising a camera lens adjacent to the image sensor, the lens having a focal axis, the display angled below the focal axis.

* * * * *